United States Patent
Sarbadhikari (10) Patent No.: US 6,732,994 B2
(45) Date of Patent: May 11, 2004

(54) INTRAOCULAR LENS MANUFACTURING APPARATUS

(75) Inventor: Kamal K. Sarbadhikari, Penfield, NY (US)

(73) Assignee: Bausch & Lomb Incorporated, Rochester, NY (US)

(*) Notice: Subject to any disclaimer, the term of this patent is extended or adjusted under 35 U.S.C. 154(b) by 29 days.

(21) Appl. No.: 10/084,694

(22) Filed: Feb. 27, 2002

(65) Prior Publication Data

US 2002/0082690 A1 Jun. 27, 2002

Related U.S. Application Data

(62) Division of application No. 09/507,151, filed on Feb. 18, 2000, now Pat. No. 6,391,230.

(51) Int. Cl.⁷ .............................................. B29D 11/00
(52) U.S. Cl. ........................ 249/134; 249/160; 425/808
(58) Field of Search ................ 249/134, 160; 425/808

(56) References Cited

U.S. PATENT DOCUMENTS

| | | |
|---|---|---|
| 4,208,362 A | 6/1980 | Deichert et al. |
| 4,681,585 A | 7/1987 | Sayano et al. |
| 4,701,288 A | 10/1987 | Cook et al. |
| 4,815,690 A | 3/1989 | Shepherd |
| 4,921,205 A * | 5/1990 | Drew et al. ............... 249/61 |
| 5,041,133 A | 8/1991 | Sayano et al. |
| 5,236,970 A | 8/1993 | Christ et al. |
| 5,376,694 A | 12/1994 | Christ et al. |
| 5,458,819 A * | 10/1995 | Chirila et al. ........... 264/1.7 |
| 5,466,147 A * | 11/1995 | Appleton et al. ......... 425/412 |
| 5,494,946 A | 2/1996 | Christ et al. |
| 5,661,195 A | 8/1997 | Christ et al. |
| 5,762,836 A | 6/1998 | Bos et al. |
| 5,837,156 A | 11/1998 | Cumming |
| 5,869,549 A | 2/1999 | Christ et al. |

FOREIGN PATENT DOCUMENTS

| | | |
|---|---|---|
| EP | 0 328 246 A2 | 8/1989 |
| EP | 0 552 528 A1 | 7/1993 |
| EP | 0 920 980 A2 | 9/1999 |

* cited by examiner

Primary Examiner—James P. Mackey
Assistant Examiner—Donald Heckenberg
(74) Attorney, Agent, or Firm—Katherine McQuire; Rita D. Vacca (57) ABSTRACT

A method of cast molding an intraocular implant from two or more dissimilar materials using disposable molds. The subject cast molding method is particularly useful in the production of intraocular lenses manufactured from dissimilar materials. It is desirable to produce intraocular lenses from dissimilar materials in order to optimize the optical characteristics of the intraocular lens optic portion and to optimize stability and flexibility characteristics of the intraocular lens haptic elements.

7 Claims, 10 Drawing Sheets

INTRAOCULAR LENS MANUFACTURING APPARATUS

This application is a divisional of prior application Ser. No. 09/507,151, filed Feb. 18, 2000, now U.S. Pat. No. 6,391,230.

FIELD OF THE INVENTION

The present invention relates to a method of cast molding a surgical implant produced from two or more dissimilar materials, implants so produced and molds useful thereof. More particularly, the present invention relates to a method of cast molding intraocular lenses produced from two or more dissimilar materials using disposable plastic molds.

BACKGROUND OF THE INVENTION

The use of intraocular lenses (IOLs) to improve vision through the replacement of damaged or diseased natural lenses or to work in conjunction with a natural lens has obtained wide acceptance since the early 1980s. Accordingly, a wide variety of IOLs has been developed for surgical implantation into the posterior and/or anterior chamber of an eye. Commercially available IOLs generally comprise an optic portion and one or more haptic elements or plates to maintain proper positioning of the optic portion within the eye. The optic portions of such IOLs are commonly manufactured from relatively hard or rigid materials such as, for example, polymethylmethacrylate (PMMA), or from relatively soft, resilient polymeric materials such as, for example, hydrogels, acrylics or silicones. More resilient polymeric materials are advantageous in the production of IOLs in that such materials are deformable and foldable to allow for implantation of the IOL through a smaller incision than that possible if implanting a more rigid IOL.

To manufacture a biocompatible IOL using known molding techniques, a polished stainless steel mold, having a mold cavity formed in a shape to achieve the desired refraction of light for the particular material utilized, is first selected. In the case of silicone for example, the uncured silicone polymer is introduced into the mold cavity and then cured. Several methods of molding IOLs are known such as injection molding, liquid injection molding, compression molding and transfer molding.

Several significant problems have been associated with known IOL molding techniques. The first problem is that current molding processes are labor intensive. Many elastomers used to mold IOLs, such as for example silicone elastomers, often times leave a residue in the stainless steel molds. Due to this residue, the molds must be cleaned between each molding cycle. In addition to being labor intensive, the cleaning requirements result in significant downtime for the equipment, which further increases production costs. A second problem associated with current known molding techniques is that of frequent tool damage and wear due to the repeated cleanings. Accordingly, molds must be replaced often resulting in increased production costs. A third problem associated with such molding techniques is one of quality control with respect to the molded lenses. Intraocular implants such as IOLs must have smooth polished edges for implantation within an eye. Improperly finished edges on implants may result in damage to interior structures of the eye. In the cas of improperly finished edges on IOLs, abrasions of the iris and tearing of the trabecular meshwork may result. Unfortunately, steel molds typically leave minute gaps between mold halves during the molding operation due to construction tolerances. Consequently, material flows out through the gaps during the molding of the IOL resulting in a phenomenon known as "flash". Flash is unwanted material attached at the mold parting line on the molded implant. This flash material must be ground and/or polished off the implant, which is again labor intensive and increases production costs.

SUMMARY OF THE INVENTION

The present invention is a process for cast molding surgical implants, such as but not limited to corneal inlays, shunts and intraocular lenses (IOLs), but most preferably IOLs, wherein in the case of IOLs, the optic portion and haptic elements are produced using two or more dissimilar biocompatible materials. However, if desired, the subject molds and molding techniques are likewise useful in the manufacture of surgical implants such as in the case of IOLs having an optic portion and haptic elements produced using the same or similar biocompatible materials. The present cast molding process avoids the problems noted with regard to known molding techniques through the use of disposable plastic molds, which are less expensive and less labor intensive to make and use.

The cast molding process of the present invention utilizes a multi-part, but preferably in the case of more customary IOLs a four-part, disposable plastic mold system. The first mold part of the subject mold system is a female base mold having a positioning wall formed along the periphery of an interior surface thereof and a molding surface on the interior surface. The molding surface is comprised of a center cavity used to form one surface of an IOL optic portion, one or more but preferably two junction cavities and two or more haptic element cavities. The center cavity is in fluid connection with each junction cavity. Also, each haptic element cavity is in fluid connection with at least one junction cavity.

The second mold part of the subject mold system is a center male mold having a molding surface on an interior surface comprised of an optic cavity used to form the second surface of the IOL optic portion. The center male mold is sized to be fully received within the positioning walls of the female base mold and may be shaped to ensure axial and rotational alignment.

The third and fourth mold parts of the subject mold system are haptic molds. Each haptic mold likewise has a molding surface on an interior surface comprised of one or more junction cavities and at least one haptic element cavity. When the haptic molds are placed in an interlocked relationship with center male mold, junction cavities and haptic element cavities are in fluid connection with optic cavity. Haptic molds are also male molds sized to be fully received within the positioning walls of the female base mold and preferably shaped to ensure axial and rotational alignment. Each haptic mold is also formed to have material guides or ports extending from the haptic element cavity and/or junction cavity through to the exterior surface of the mold. Optionally, center male mold and haptic molds may be formed as a unitary mold.

The subject preferably four-part mold is used to cast mold a surgical implant, preferably an IOL, using two or more dissimilar biocompatible materials. An IOL having an optic portion of one preferably more resilient biocompatible material and haptic elements of a dissimilar preferably more rigid biocompatible material is produced by filling the base mold center cavity with the desired more resilient IOL optic material. The center male mold is then inserted into the female base mold allowing excess molding material to pass into one or more overflow reservoirs. During this process, some molding material flows into fluidly connected junction cavities so as to only partially fill the same. Shields are then positioned over the partially filled junction cavities and the molding material in the center cavity is polymerized using methods of polymerization known to those skilled in the art. Due to shielding, or any suitable method of protection, the molding material in the junction cavities is not polymerized. After removing the shields, the haptic molds are then inserted into the female base mold and a second dissimilar relatively rigid biocompatible molding material is provided through the material guides or ports to completely fill the junction cavities and the haptic element cavities. The remaining unpolymerized first molding material and the second molding material are then polymerized using methods of polymerization known to those skilled in the art. Following polymerization, all three male molds are removed from the female mold. The IOL is removed from the female mold through the use of solvents or vibration.

Accordingly, it is an object of the present invention to provide a cast molding system to produce IOLs having an optic portion and haptic elements produced from dissimilar biocompatible materials.

Another object of the present invention is to provide a method for cast molding IOLs having an optic portion and haptic elements produced from dissimilar materials which is less labor intensive.

Another object of the present invention is to provide a method for cast molding IOLs having an optic portion and haptic elements produced from dissimilar materials with lower production costs.

Another object of the present invention is to provide molds for cast molding IOLs having an optic portion and haptic elements produced from dissimilar materials.

Still another object of the present invention is to provide a method for cast molding IOLs having an optic portion and haptic elements produced from dissimilar materials suitable for high volume production.

These and other objectives and advantages of the present invention, some of which are specifically described and others that are not, will become apparent from the detailed description, drawings and claims that follow wherein like features are designated by like numerals.

DETAILED DESCRIPTION OF THE INVENTION

Figure 1:
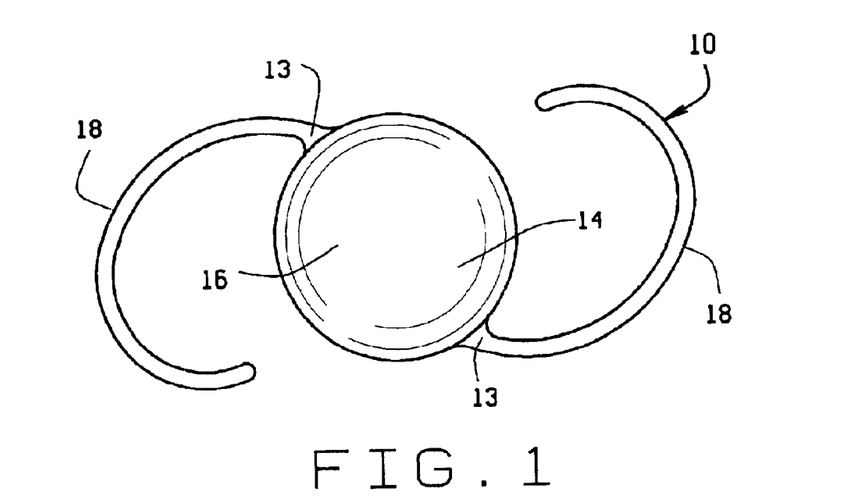
FIG. 1 is a plan view of an intraocular lens having an optic portion and two haptic elements.
Figure 2:
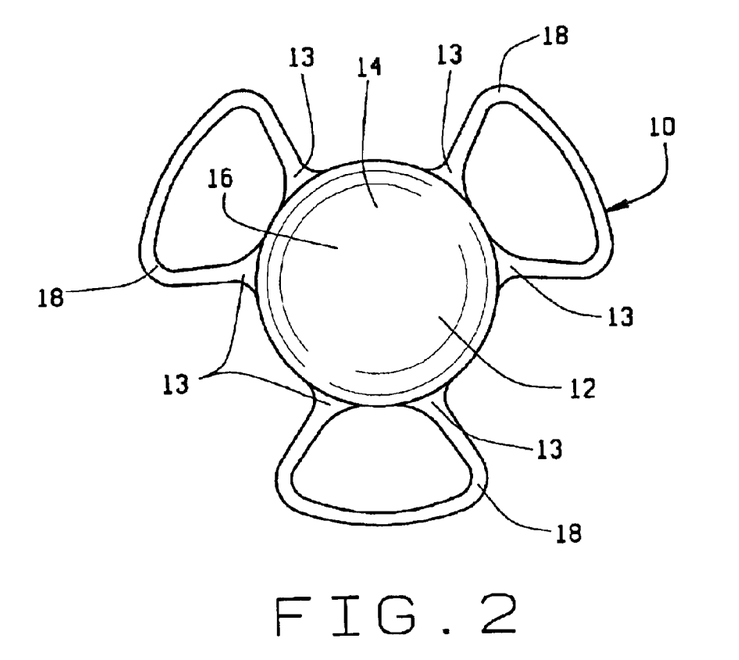
FIG. 2 is a plan view of an intraocular lens having an optic portion and three looped haptic elements.
Figure 3:
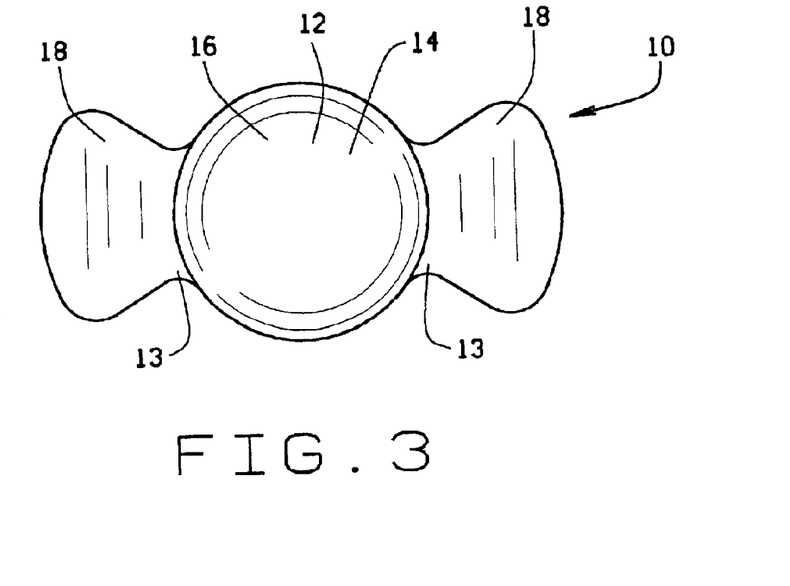
FIG. 3 is a plan view of an intraocular lens having an optic portion and two plate haptic elements.

The present invention is a method of cast molding surgical implants, such as most preferably intraocular lenses (IOLs), from dissimilar biocompatible materials, disposable molds useful for such cast molding method and surgical implants produced using such cast molding method. FIGS. 1 through 3 illustrate various IOLs that may be molded using the cast molding method of the present invention. Various IOLs are illustrated herein for purposes of example only and are not intended to be in any way limiting to the scope of the present invention. FIG. 1 illustrates an IOL 10 having an optic portion 12 and two haptics 18. FIG. 2 illustrates an IOL 10 having an optic portion 12 and three looped haptics 18. FIG. 3 illustrates an IOL 10 having an optic portion 12 and two plate haptics 18.

The present cast molding method is useful in the manufacture of surgical implants, such as IOLs 10 as illustrated in FIGS. 1 through 3, wherein the optic portion 12 and haptic elements 18 are produced using two or more dissimilar biocompatible materials. It is desirable to produce IOLs 10 from dissimilar materials to optimize optical characteristics of the IOL 10 optic portion 12, optimize support and flexibility characteristics of the IOL 10 haptic elements 18, and, if desired, to also optimize support and flexibility characteristics of the IOL 10 haptic attachment area 13. However, if desired, the subject molds may be used in the manufacture of IOLs 10 having an optic portion 12 and haptic elements 18 produced using the same or similar biocompatible materials.

Suitable biocompatible optic molding materials include but are not limited to most preferably materials having a refractive index of 1.25 or higher and a level of resiliency that enables the material to return to its original shape after having been folded or compressed in small incision implantation. Examples of such materials include but are not limited to silicone polymers, hydrocarbon and fluorocarbon polymers, hydrogels, soft acrylic polymers, polyesters, polyamides, polyurethane, silicone polymers with hydrophilic monomer units, fluorine-containing polysiloxane elastomers and combinations thereof. The preferred material for the production of optic portion 12 due to desirable characteristics is a hydrogel made from 2-hydroxyethyl methacrylate (HEMA) and 6-hydroxyhexyl methacrylate (HOHEXMA), i.e., poly(HEMA-co-HOHEXMA). Suitable haptic molding materials include but are not limited to materials capable of providing support without excessive fragility. Examples of such materials include but are not limited to methacrylates, acrylates, more rigid hydrogels, silicone polymers and combinations thereof. The preferred material for the production of haptic elements 18 due to desirable characteristics is polymethyl methacrylate (PMMA).

Materials having characteristics suitable for the manufacture of other ophthalmic implants formed of dissimilar materials utilizing the method and molds of the present invention become obvious to those skilled in the art in light of the present disclosure.

Figure 4:
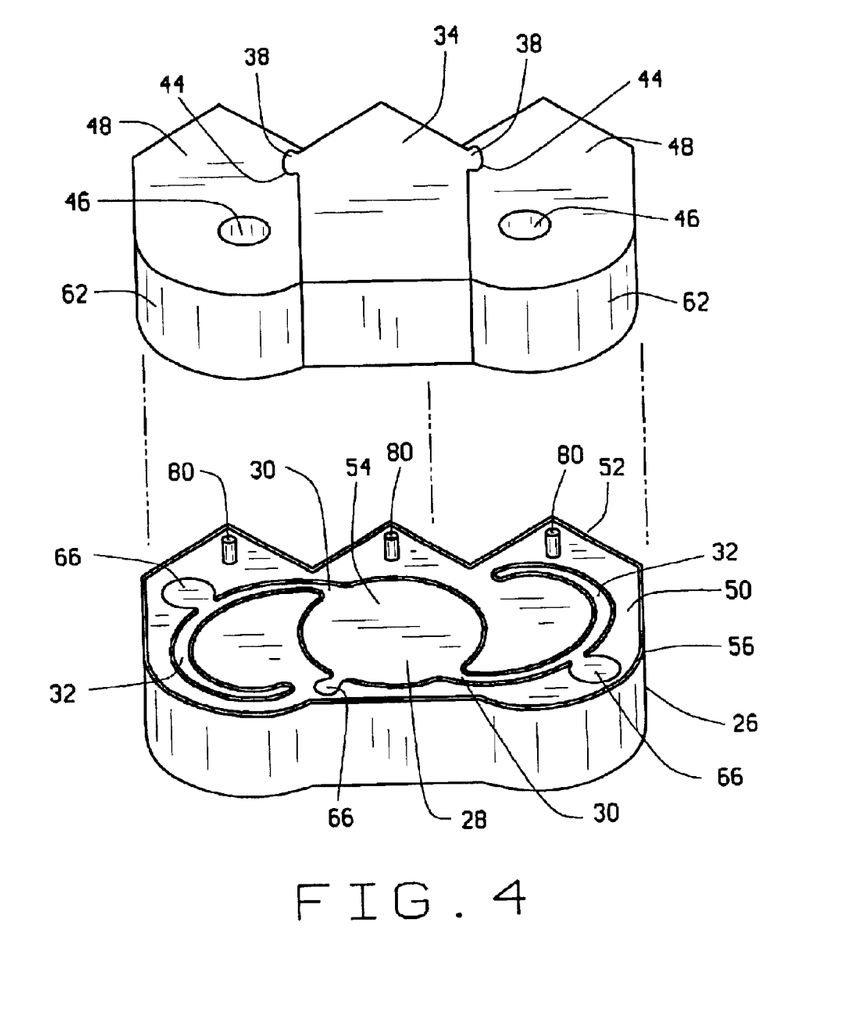
FIG. 4 is an exploded view in perspective of a disposable mold system for molding an IOL having an optic portion and haptic elements produced from dissimilar materials, constructed in accordance with the teachings of the present invention.
Figure 5:
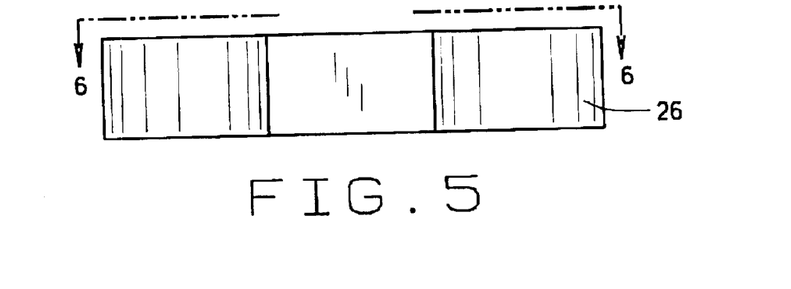
FIG. 5 is a plan side view of the female base mold of the mold system of FIG. 4.
Figure 6:
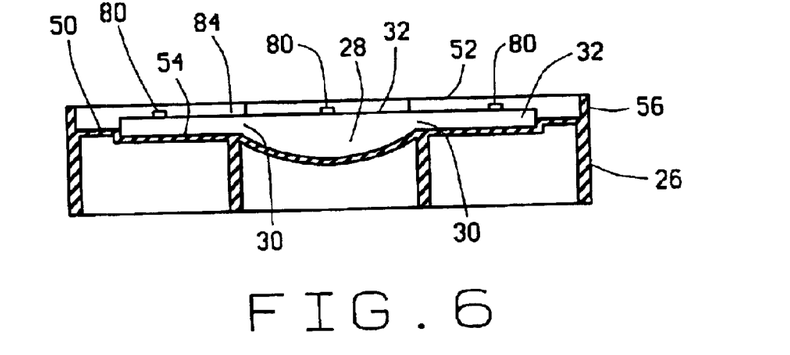
FIG. 6 is a cross-sectional side view of the female base mold of FIG. 5 taken along lines 6—6.
Figure 7:
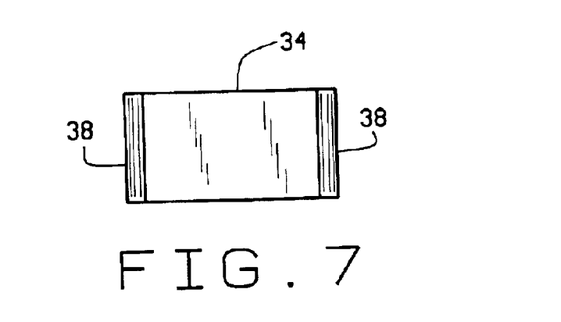
FIG. 7 is a plan side view of the center male mold of the mold system of FIG. 4.
Figure 8:
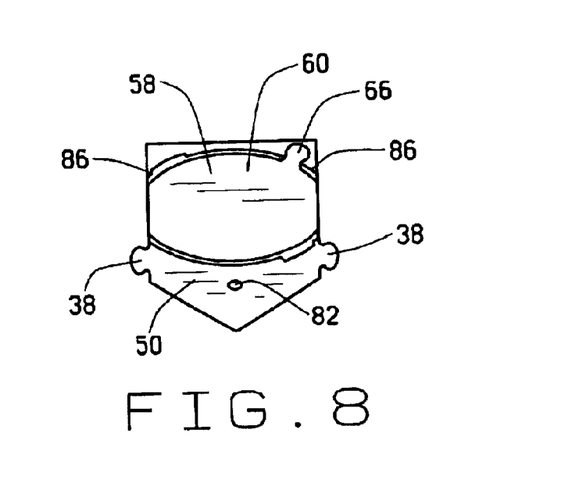
FIG. 8 is a plan bottom view of the center male mold of FIG. 7.
Figure 9:
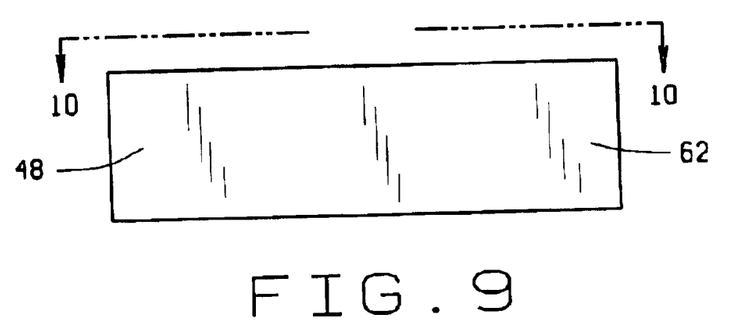
FIG. 9 is a plan side view of the haptic mold of the mold system of FIG. 4.
Figure 10:
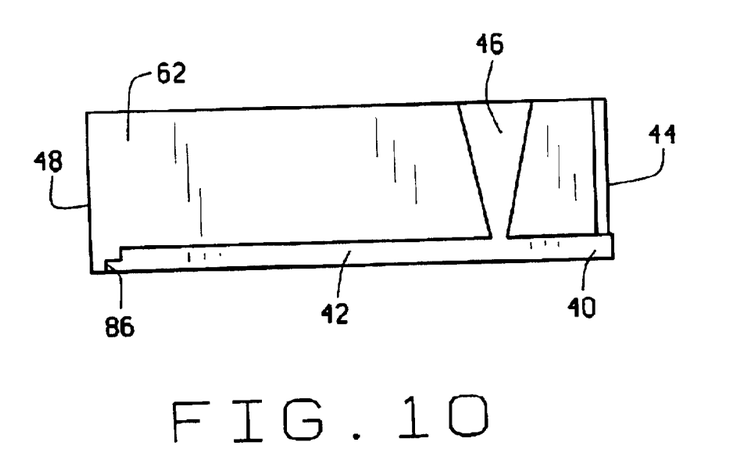
FIG. 10 is a cross-sectional side view of the haptic mold of FIG. 9 taken along lines 10—10.

The cast molding method or process of the present invention utilizes a multi-part, but preferably a four-art for manageability, disposable plastic mold system 24 as best illustrated in FIG. 4. The first part of mold system 24 is female base mold 26 having a positioning wall 52 along periphery 56 of interior surface 50 and a molding surface 54 comprised of a center cavity 28, used to form one anterior surface 14 or posterior surface 16 of optic portion 12, one or more but preferably two junction cavities 30 in fluid connection with center cavity 28 and at least one haptic element cavity 32 in fluid connection with junction cavities 30. Surrounding center cavity 28, junction cavities 30 and haptic element cavity 32 is extended edge 84 to eliminate material flow between molds to prevent flash. Base mold 26 is sized as needed according to the article to be manufactured using the same. For the manufacture of IOLs 10, base mold 26 is approximately 20 to 35 mm but preferably approximately 25 to 35 mm in length for ease in handling, approximately 10 to 20 mm but preferably approximately 15 to 20 mm in width for ease in handling and approximately 10 to 20 mm but preferably 15 to 20 mm in height for ease of handling. Each of the molding cavities of base mold 26 may be sized to be slightly larger in size than the final IOL product desired to accommodate for material shrinkage, often times as high as 15 percent, during polymerization thereof. Alternatively, overflow reservoirs 66 may be shielded from polymerization whereby nonpolymerized material therein may flow into adjacent cavities upon shrinkage of polymerized material in the adjacent cavities and b polymerized. Polymerization of material to form an implant is preferably carried out under pressure within the range of approximately 50,000 pounds per square inch at extended edge 84 and edge recess 86 to eliminate cosmetic defects in the product formed.

Figure 11:
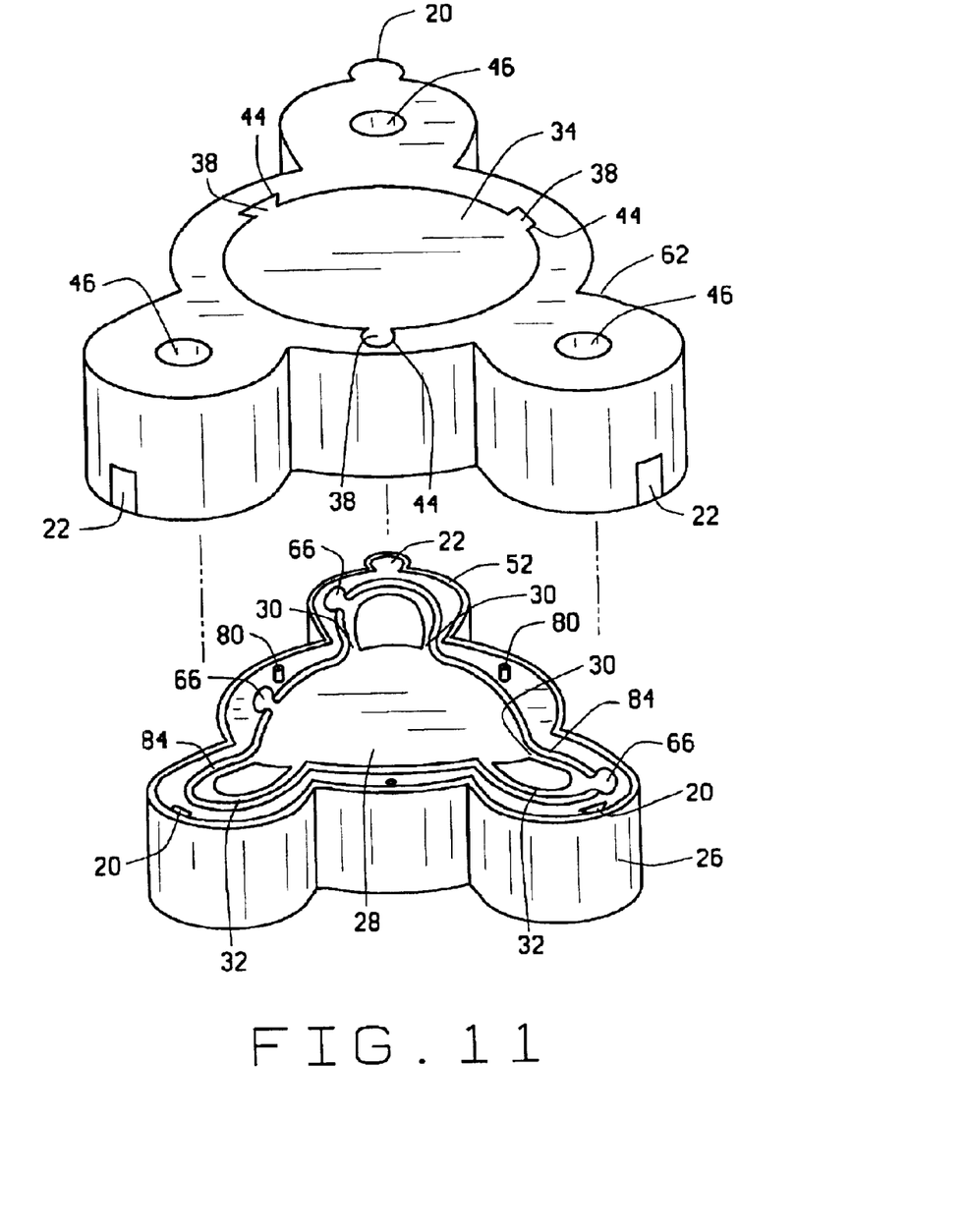
FIG. 11 is an exploded view in perspective of a disposable mold system for molding an IOL having an optic portion and haptic elements produced from dissimilar materials, constructed in accordance with the teachings of the present invention.
Figure 12:
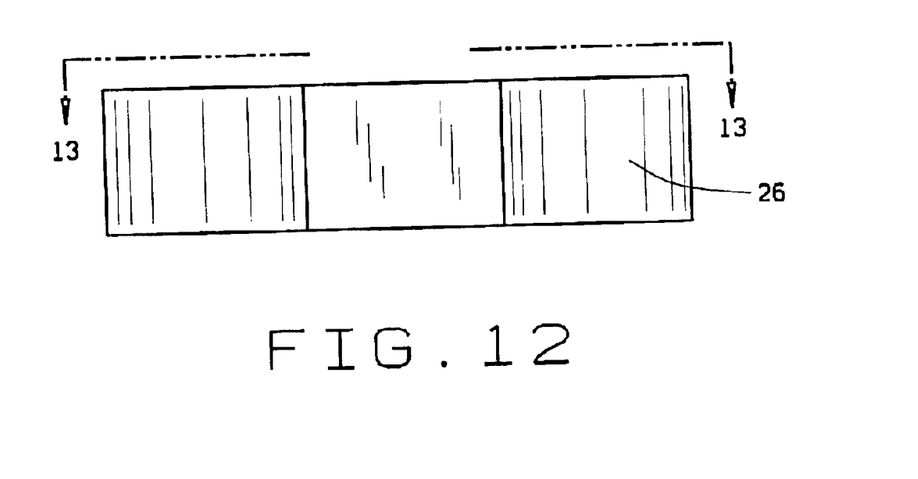
FIG. 12 is a plan side view of the female base mold of the mold system of FIG. 11.
Figure 13:
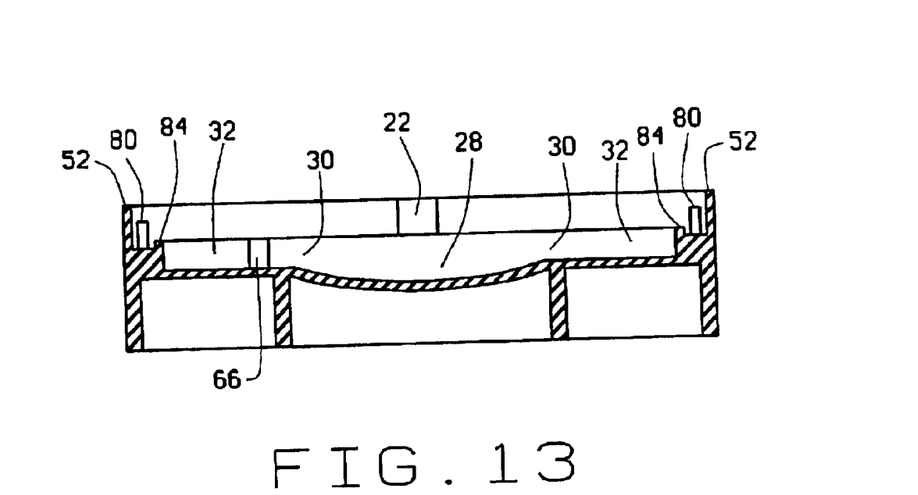
FIG. 13 is a cross-sectional side view of the female base mold of FIG. 12 taken along lines 13—13.
Figure 14:
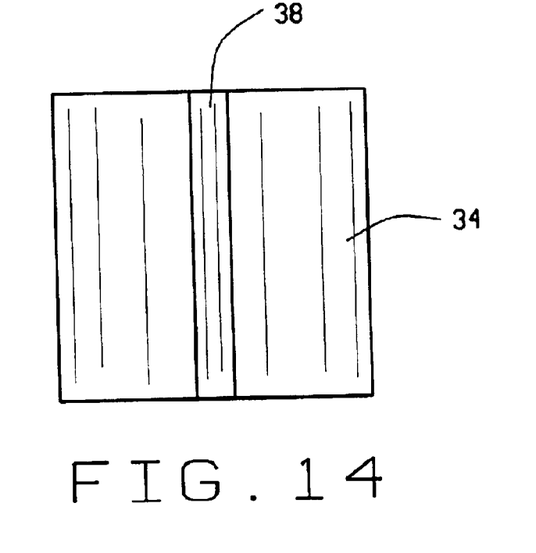
FIG. 14 is a plan side view of the center male mold of the mold system of FIG. 11.
Figure 15:
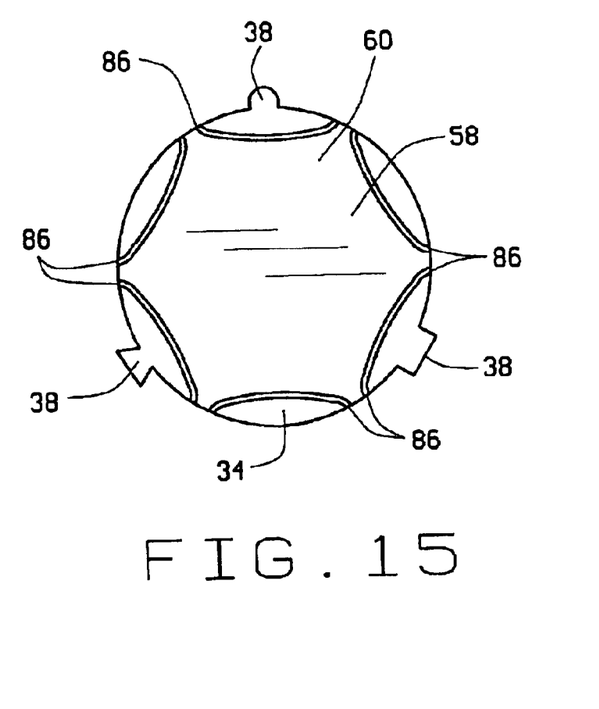
FIG. 15 is a plan bottom view of the center male mold of FIG. 14.
Figure 16:
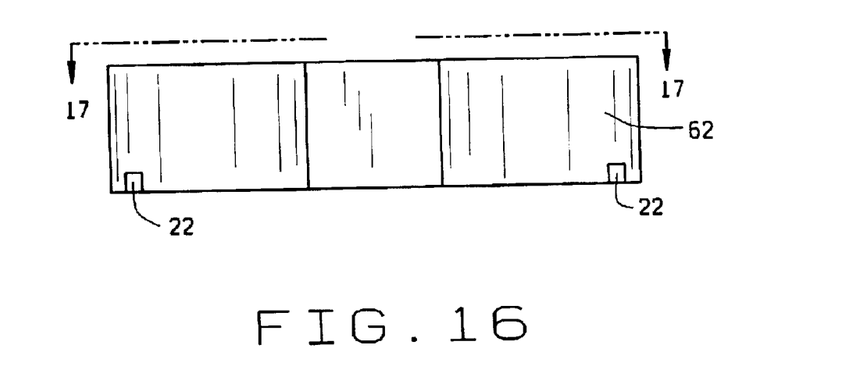
FIG. 16 is a plan side view of the haptic mold of the mold system of FIG. 11.
Figure 17:
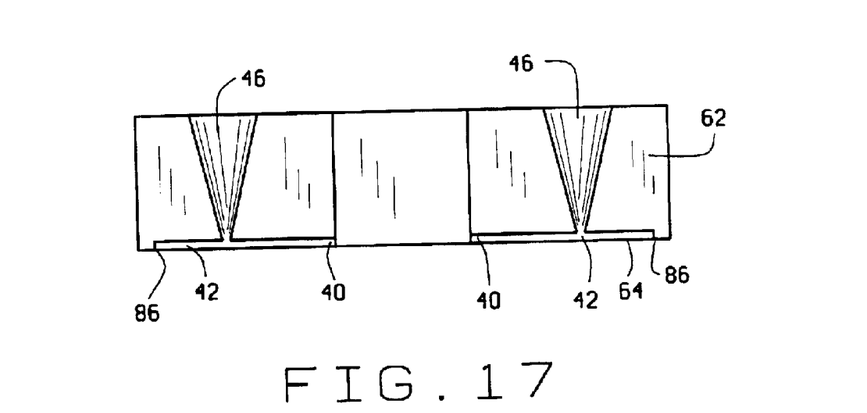
FIG. 17 is a cross-sectional side view of the haptic mold of FIG. 16 taken along lines 17—17.
Figure 18:
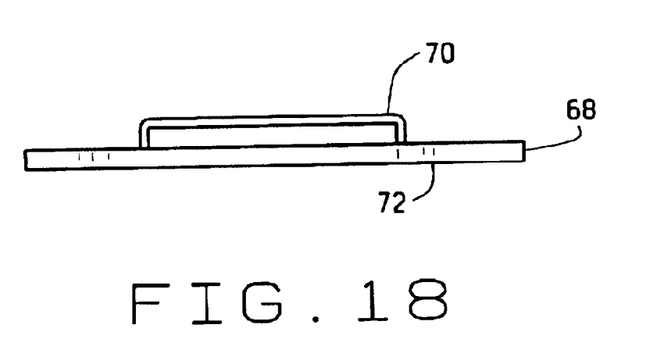
FIG. 18 is a plan side view of a shield useful with the mold system of FIG. 4 or FIG. 11.

The second part of mold system 24 is center male mold 34 having an interior surface 50 with a molding surface 5B comprised of an optic cavity 60 used to form the second surface, either anterior surface 14 or posterior surface 16 of optic portion 12, surrounded by edge recess 86. Edge recess 86 is sized to accept and work in conjunction with extended edge 84 of female base mold 26. Center male mold 34 is sized to be fully received snugly within positioning walls 52 of female base mold 26 and shaped to interlock for axial and rotational alignment. To ensure axial and rotational alignment, any of a variety of means may be used such as for example but not limited to providing base mold 26 and center male mold 34 with aligning pins 80 and pin recesses 82 on interior surface 50 thereof, providing shape specific forms to base mold 26 and center male mold 34 such as illustrated in FIG. 4 and/or providing base mold 26 and center male mold 34 with tab 20 and groove 22 alignment means as illustrated in FIG. 11. For the manufacture of IOLs 10, center male mold 34 is approximately 5 to 12 mm but preferably approximately 6 to 10 mm in length to allow optic cavity 60 to be slightly larger than the final desired optic diameter, approximately 8 to 18 mm but preferably approximately 13 to 18 mm in width for proper fit within positioning walls 52 and approximately 10 to 20 mm but preferably 15 to 20 mm in height for ease of handling. As noted above, optic cavity 60 of center male mold 34 may be sized to be slightly larger in size than the final optic portion 12 desired due to material shrinkage during polymerization thereof.

The third and fourth mold parts of mold system 24 are haptic molds 62. Each haptic mold 62 likewise has an interior surface 50 with molding surface 64 comprised of one or more junction cavities 40 and at least one haptic element cavity 42 in fluid connection with optic cavity 60 surrounded by edge recess 86. Haptic molds 62 are male molds sized to be fully received within positioning walls 52 of the female base mold 26 and shaped to interlock for axial and rotational alignment as described above. Haptic molds 62 are also formed to have material guides or ports 46 extending from haptic element cavity 42 and/or junction cavity 40 through to the exterior surface 48 of the haptic mold 62. For the manufacture of IOLs 10, haptic mold 62 is approximately 14 to 22 mm but preferably approximately 18 to 24 mm in length to allow proper fit within positioning walls 52, approximately 8 to 18 mm but preferably approximately 13 to 18 mm in width to allow proper fit within positioning walls 52 and approximately 10 to 20 mm but preferably 15 to 20 mm in height for ease of handling. As noted above, each cavity of haptic mold 62 may be sized to be slightly larger in size than the final corresponding product part desired due to material shrinkage during polymerization thereof.

Suitable materials from which mold system 24 may be manufactured include for example but are not limited to polyurethanes, polypropylene, polyvinyl chloride or acrylates. In the case of ultraviolet light curing of the IOL 10 materials, a transparent or translucent material such as polypropylene is preferred.

The subject preferably four-part mold system 24 is useful to cast mold intraocular implants such as preferably an IOL 10 having an optic portion 12 and haptics 18 preferably manufactured from dissimilar biocompatible materials. An IOL 10 is cast molded in, accordance with the present invention by providing a predetermined quantity of a suitable optic portion 12 molding material into the center cavity 28 of base mold 26. The center male mold 34 is then inserted within positioning walls 52 of female base mold 26 allowing excess molding material to pass into one or more overflow reservoirs 66. During this process, some molding material flows into junction cavities 30. Shields 68 are then placed within positioning walls 52 using handles 70 to shield interior surface 50 of base mold 26. Base 72 of shield 68 is dimensioned to be the same as that of interior surface 50 of haptic mold 62 to ensure proper fit within positioning walls 52. Shields 68 are preferably fabricated from the same material as mold system 24 with the addition of an ultraviolet light absorber such as for example but not limited to 2-hydroxy-5-acryloyloxyphenyl-2H-benzotriazoles or vinylsilylalkoxyarylbenzotriaioles. The molding material between center cavity 28 and optic cavity 60 is then polymerized using methods of polymerization known to those skilled in the art such as but not limited to ultraviolet light or heat curing. Due to shields 68, the molding material in junction cavities 30 is not polymerized. Shields 68 are then removed from base mold 26 and haptic molds 62 are then placed within positioning walls 52of female base mold 26. Suitable haptic molding material is provided through material guides 46 of haptic molds 62 to fill junction cavities 30 and 40 and haptic element cavities 32 and 42 with any excess material flowing into reservoir 66. The haptic molding material is then polymerized using methods of polymerization known to those skilled in the art such as but not limited to ultraviolet light or heat curing. Following polymerization, all three male molds, i.e., the center male mold 34 and both haptic molds 62, are removed from female base mold 26. IOL 10 is removed from female base mold 26 through the use of solvents or vibration. IOL 10 is then optionally polished as needed, sterilized and packaged as customary in the art.

As described in detail above, the method of cast molding intraocular implants such as but not limited to IOLs, the molds suitable for such cast molding and the IOLs so produced in accordance with the present invention provides a relatively inexpensive method of manufacturing implants produced from two or more dissimilar materials. The present description is provided for purposes of illustration and explanation. It will be apparent to those skilled in the art that modifications and changes may be made to the preferred embodiment described herein without departing from its scope and spirit.

I claim:

1. A mold system for molding an intraocular lens having an optic portion, having first and second surfaces and one or more haptics attached to said optic portion, said optic portion and said one or more haptics being molded from dissimilar materials, said mold system comprising:

a) a female base mold having a center cavity, at least one junction cavity and at least one haptic cavity all in fluid communication with each other;

b) a center male mold having a molding surface for aligning with said center cavity of said female base mold for forming the first and second optic portion surfaces, respectively; and c) at least one haptic mold having a molding surface for aligning with said at least one haptic cavity in said female base mold, whereby said intraocular lens is molded by curing a first mold material between said center cavity and said molding surface of said center male mold and thereby forming said optic portion, and subsequently curing a second mold material, different from said first mold material, between said haptic activities and said molding surfaces of said at least one haptic mold, and thereby forming said at least one haptic attached to said optic portion.

2. The mold system of claim 1 wherein said molds are formed from the same or different materials selected from the group consisting of polyurethanes, polypropylene, polyvinyl chloride and acrylates.

3. The mold system of claim 1 wherein said molds are formed from polyurethane.

4. The mold system of claim 1 wherein said molding surfaces have mold cavities surrounded by an extended edge or a recessed edge to prevent flash.

5. The mold system of claim 1 and further comprising a polymerization shield for placing on said female base mold together with said center male mold whereby said polymerization shield prevents the polymerization of said first mold material in said at least one junction cavity, said polymerization shield being removed from said female base mold following polymerization of said first mold material between said center cavity and said molding surface of said center mold and prior to placement of said at least one haptic mold on said female base mold.

6. The mold system of claim 1 wherein said center male mold is rotationally fixed to said female mold when assembled therewith.

7. The mold system of claim 6 wherein said at least one haptic mold is rotationally fixed to said female mold when assembled therewith.

\* \* \* \* \*

UNITED STATES PATENT AND TRADEMARK OFFICE
CERTIFICATE OF CORRECTION

PATENT NO. : 6,732,994 B2
DATED : May 11, 2004
INVENTOR(S) : Kamal K. Sarbadhikari It is certified that error appears in the above-identified patent and that said Letters Patent is hereby corrected as shown below:

Column 8,
Line 27, replace "said center" with -- said center male --.

Signed and Sealed this

Twelfth Day of April, 2005

JON W. DUDAS
*Director of the United States Patent and Trademark Office*